(12) United States Patent
Nakajima et al.

(10) Patent No.: US 12,360,417 B2
(45) Date of Patent: Jul. 15, 2025

(54) LIQUID CRYSTAL MODULE AND HEAD-MOUNTED DISPLAY

(71) Applicant: Sharp Display Technology Corporation, Kameyama (JP)

(72) Inventors: Junki Nakajima, Kameyama (JP); Yohji Inui, Kameyama (JP); Takafumi Tobi, Kameyama (JP); Katsutoshi Kikuchi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/807,348

(22) Filed: Aug. 16, 2024

(65) Prior Publication Data

US 2025/0102856 A1 Mar. 27, 2025

(30) Foreign Application Priority Data

Sep. 22, 2023 (JP) .................. 2023-158356

(51) Int. Cl.
*G02F 1/1333* (2006.01)
*F21V 8/00* (2006.01)
*G02F 1/1335* (2006.01)
*G02F 1/13357* (2006.01)
*G06F 1/16* (2006.01)

(52) U.S. Cl.
CPC ......... *G02F 1/1336* (2013.01); *G02B 6/0043* (2013.01); *G02B 6/0045* (2013.01); *G02F 1/133526* (2013.01); *G06F 1/163* (2013.01)

(58) Field of Classification Search
CPC ............ G02B 6/0045; G02F 1/133615; G02F 1/133603

USPC ........................................................... 349/11
See application file for complete search history.

(56) References Cited

U.S. PATENT DOCUMENTS

| | | | | |
|---|---|---|---|---|
| 2009/0103009 A1* | 4/2009 | Ohmi | ................ | G02B 6/002 349/67 |
| 2009/0151576 A1* | 6/2009 | Ito | ................ | B29C 63/04 100/305 |
| 2013/0038817 A1* | 2/2013 | Hirayama | ............ | G02B 6/0045 349/65 |
| 2015/0301384 A1* | 10/2015 | Koike | .................. | G02B 6/0038 349/65 |
| 2017/0184775 A1* | 6/2017 | Kang | .................. | G02B 6/0058 |
| 2017/0205571 A1* | 7/2017 | Kim | ...................... | G02B 6/009 |
| 2020/0209463 A1* | 7/2020 | Kim | ...................... | G02B 6/0088 |
| 2021/0325729 A1* | 10/2021 | Tan | .................... | G02F 1/133611 |

FOREIGN PATENT DOCUMENTS

WO 2021/149470 A1 7/2021

* cited by examiner

*Primary Examiner* — Christopher M Raabe
(74) *Attorney, Agent, or Firm* — ScienBiziP, P.C.

(57) ABSTRACT

A liquid crystal module comprises: a lens unit including at least a first lens; a liquid crystal panel; and a backlight unit, all of which are provided in a stated order, wherein the backlight unit includes: a light-guide plate; and a first light source opposite a first side face of the light-guide plate, and the light-guide plate has: the first side face; and a light-exiting face through which light incident on the first side face is discharged toward the liquid crystal panel, the light-guide plate further having a curved face portion in a cross-section in a first direction that is perpendicular to the first side face and the light-exiting face.

9 Claims, 16 Drawing Sheets

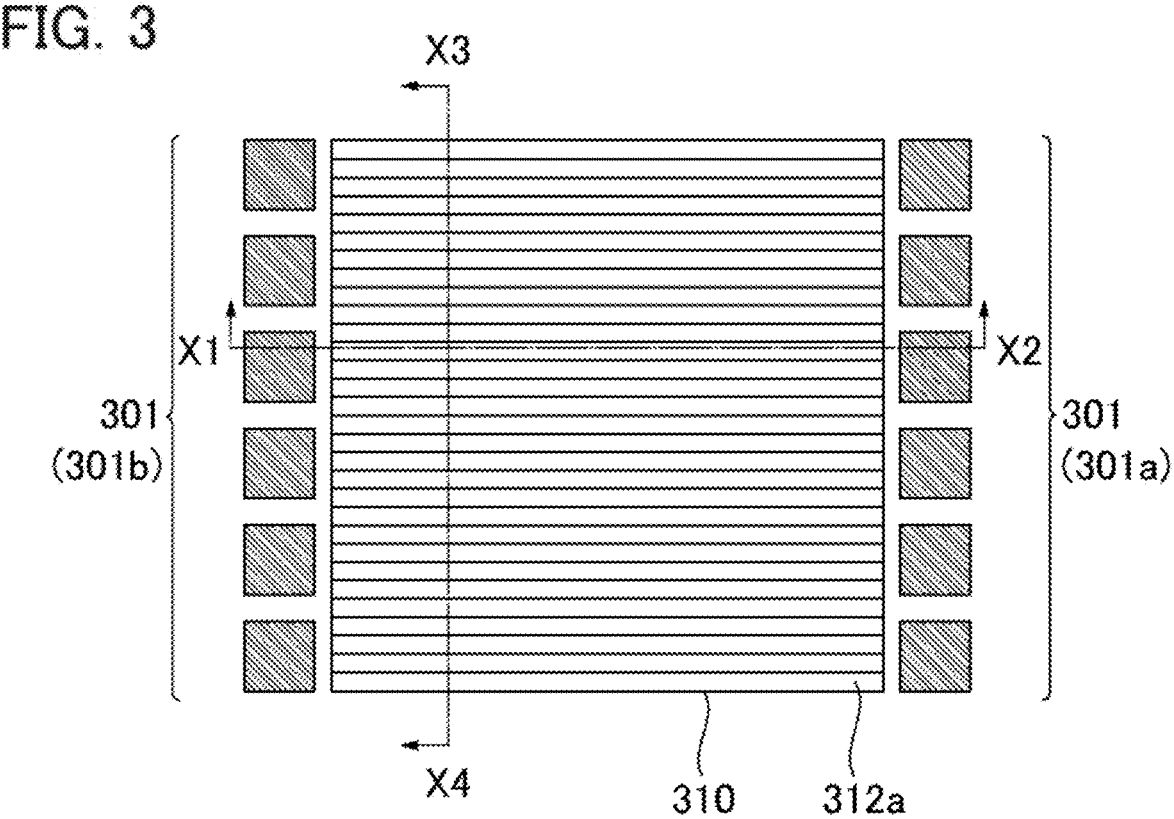
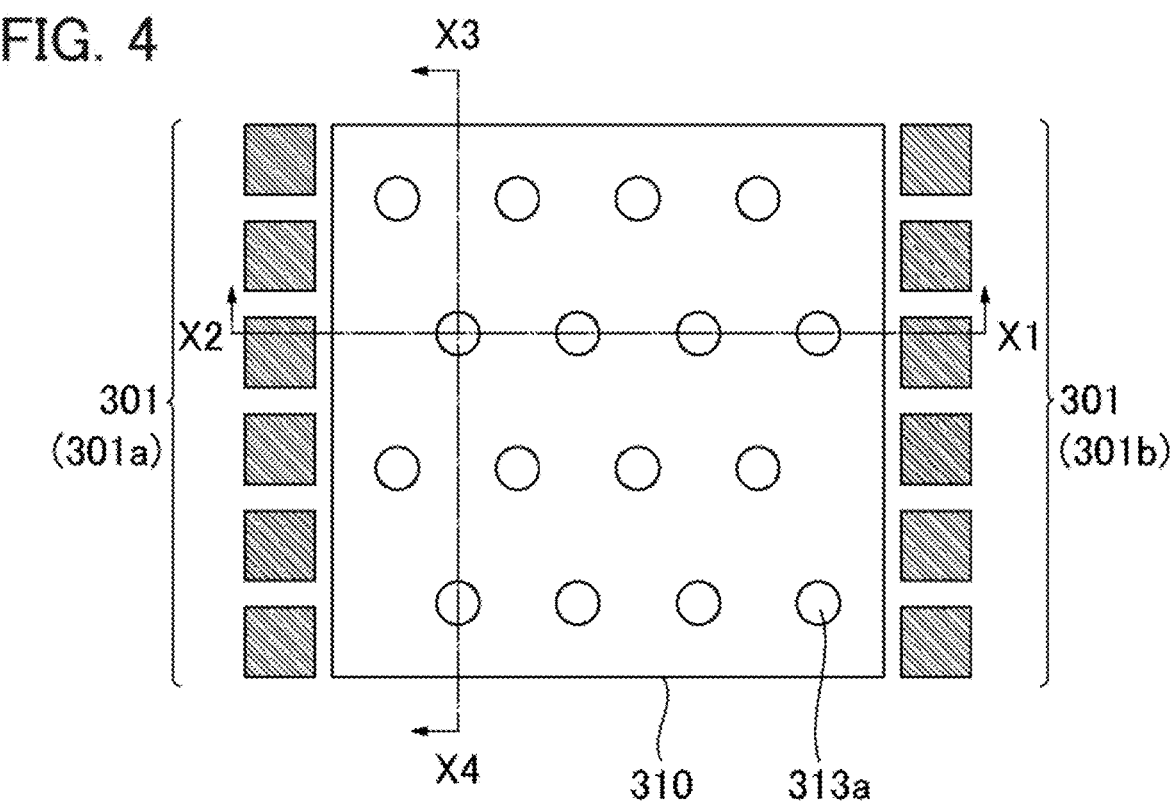

LEFT-EYE
LIQUID CRYSTAL MODULE

RIGHT-EYE
LIQUID CRYSTAL MODULE

LIQUID CRYSTAL MODULE AND HEAD-MOUNTED DISPLAY

CROSS-REFERENCE TO RELATED APPLICATION

The present application claims priority from Japanese Application JP2023-158356, the content of which is hereby incorporated by reference into this application.

BACKGROUND

Field

The following disclosure relates to liquid crystal modules and head-mounted displays using a liquid crystal module. Goggle-like wearable display devices are used to view content compatible with, for example, VR (virtual reality) technology and AR (augmented reality) technology. These display devices are generally referred to as head-mounted displays (HMDs). Developments have been made in liquid crystal display devices used in HMDs. The HMD has a structure including, as an example: a display panel such as a liquid crystal panel; and a backlight on the rear face side of the display panel.

For instance, Patent Literature 1 discloses a display device including a display panel including a plurality of light-emitting elements each including: a light-emitting section; and a light-emission-direction control member through which the light emitted by the light-emitting section passes, wherein in each light-emitting element, the light-emission-direction control member has a first area and a second area surrounding the first area, the first area containing a material that has a refractive index n1 that differs from a refractive index n2 of a material contained in the second area and discloses a display device including a direct organic EL backlight. Patent Literature 1 discusses controlling the discharge direction for an image from the display device by disposing color filters on a matrix of light-emitting elements such as organic light-emitting diodes (OLEDs, electroluminescence diodes) or light-emitting diodes (LEDs, light-emitting diodes) and further disposing light-emission-direction control members on the color filters.

CITATION LIST

Patent Literature

Patent Literature 1: PCT International Application Publication No. WO2021/149470

SUMMARY

Folded optical lens systems have been increasingly employed to reduce the size of the HMD set. Meanwhile, conventional backlights used in smartphones are presumed to be viewed from the front direction and designed to provide uniform front luminance. Therefore, luminance could be low in the periphery field of view if a conventional backlight is incorporated into an HMD using a folded optical lens system, because the light incident in oblique directions are refracted by the HMD lens, which further reduces the viewing angle in the periphery field of view of the HMD.

The present disclosure has been made in view of these problems issues and has an object to provide a liquid crystal module that can deliver uniformity between the front luminance and the luminance in the periphery field of view by means of a simple structure and also to provide a head-mounted display using such a liquid crystal module.

(1) The present disclosure, in an embodiment thereof, is directed to a liquid crystal module including: a lens unit including at least a first lens; a liquid crystal panel; and a backlight unit, all of which are provided in a stated order, wherein the backlight unit includes: a light-guide plate; and a first light source opposite a first side face of the light-guide plate, and the light-guide plate has: the first side face; and a light-exiting face through which light incident on the first side face is discharged toward the liquid crystal panel, the light-guide plate further having a curved face portion in a cross-section in a first direction that is perpendicular to the first side face and the light-exiting face.

(2) In another embodiment of the present disclosure, the liquid crystal module according to (1) above is further configured such that the curved face portion includes a first curved face portion between the first side face and the light-exiting face in the cross-section in the first direction.

(3) In another embodiment of the present disclosure, the liquid crystal module according to (2) above is further configured such that the light-guide plate has a second side face opposite the first side face in the first direction, the backlight unit includes a second light source opposite the second side face of the light-guide plate, and the curved face portion has a second curved face portion between the second side face and the light-exiting face in the cross-section in the first direction.

(4) In another embodiment of the present disclosure, the liquid crystal module according to (2) or (3) above is further configured such that the first curved face portion and the second curved face portion have different radii of curvature.

(5) In another embodiment of the present disclosure, the liquid crystal module according to any of (2) to (4) above is further configured such that the light-guide plate further has a third side face and a fourth side face opposite each other in a second direction that is perpendicular to the first direction, and the curved face portion includes, in a cross-section in the second direction, a third curved face portion between the third side face and the light-exiting face and a fourth curved face portion between the fourth side face and the light-exiting face.

(6) In another embodiment of the present disclosure, the liquid crystal module according to (1) above is further configured such that the curved face portion is disposed in a central portion of the light-exiting face and curved toward a side opposite the liquid crystal panel.

(7) In another embodiment of the present disclosure, the liquid crystal module according to any of (1) to (6) above is further configured such that the light-guide plate has a plurality of linear portions running in the first direction in the light-exiting face and a plurality of recesses formed toward the light-exiting face in a rear face opposite the light-exiting face.

(8) In another embodiment of the present disclosure, the liquid crystal module according to any of (1) to (7) above is further configured such that the lens unit further includes in a second lens between the first lens and the liquid crystal panel, and the first lens and the second lens includes respective semi-light-transmitting films on the liquid crystal panel side.

(9) The present disclosure, in another embodiment thereof, is directed to a head-mounted display including: a liquid crystal module according to any of (1) to (8) above for a right eye and; a liquid crystal module according to any of (1) to (8) above for a left eye.

The present disclosure can provide a liquid crystal module that can deliver uniformity between the front luminance and the luminance in the periphery field of view by means of a simple structure and can also provide a head-mounted display using such a liquid crystal module.

BRIEF DESCRIPTION OF DRAWINGS

FIG. 3 is a schematic plan view of light sources and a light-guide plate with a plurality of recesses and a plurality of linear portions as viewed from the light-exiting face side.

FIG. 4 is a schematic plan view of light sources and a light-guide plate with a plurality of recesses and a plurality of linear portions as viewed from the rear face side.

DESCRIPTION OF EMBODIMENTS

Figure 1:
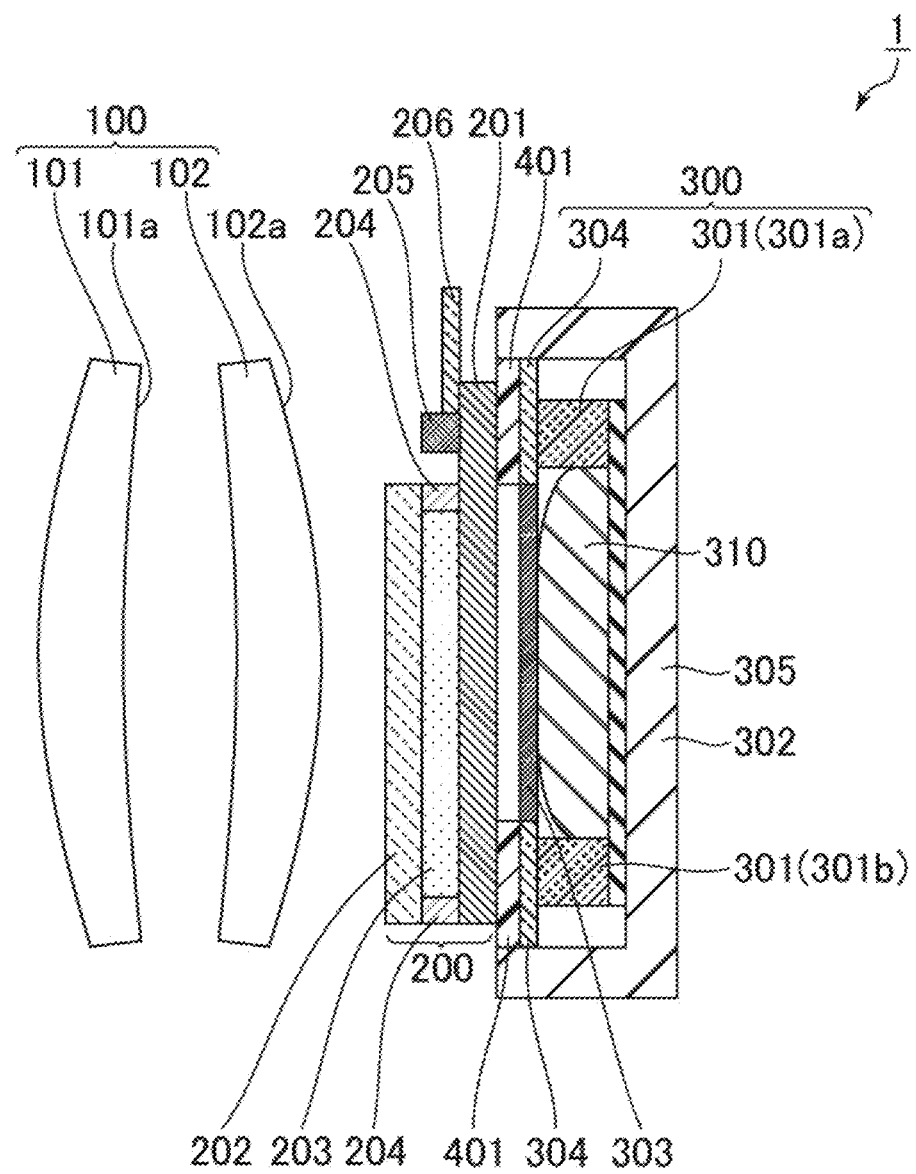
FIG. 1 is a schematic cross-sectional view of an example of a liquid crystal module in accordance with Embodiment 1.

The following will describe embodiments of the present disclosure. The present disclosure is not limited to the following description of embodiments and may be redesigned where appropriate in such a manner as to retain the essential features of the present disclosure. Note that throughout the following description, identical members and those having similar functions are indicated by the same reference numerals in different drawings where appropriate, and description of such members may not be repeated. Various embodiments of the present disclosure may be combined in a suitable manner without departing from its spirit of the present disclosure.

Embodiment 1

FIG. 1 is a schematic cross-sectional view of an example of a liquid crystal module in accordance with Embodiment 1. FIG. 1 is also a schematic horizontal cross-sectional view of the liquid crystal module while the liquid crystal module is in use. Referring to FIG. 1, a liquid crystal module 1 in accordance with Embodiment 1 includes a lens unit 100, a liquid crystal panel 200, and a backlight unit 300, all of which are provided in this order. The lens unit 100 and the liquid crystal panel 200 are disposed so as to face each other across a distance. The liquid crystal panel 200 and the backlight unit 300 may be adhered together, hence fixed, by, for example, a double-sided fixing tape 401.

Lens Unit

The lens unit 100 includes at least a first lens 101. The lens unit 100 needs only to be structured to cause the user to recognize the video outputted by the liquid crystal panel 200 as a video by focusing the video on the retina of the user.

Referring to FIG. 1, the lens unit 100 may further include a second lens 102 between the first lens 101 and the liquid crystal panel 200. Examples of the first lens 101 and the second lens 102 include biconvex lenses, plano-convex lenses, convex meniscus lenses, biconcave lenses, plano-concave lenses, concave meniscus lenses, aspherical lenses, free-curved face lenses, Fresnel lenses, and graded-index lenses. The number of lenses in the lens unit 100 is not limited in any particular manner, and other lenses may be additionally included.

Exemplary preferred combinations of the first lens 101 and the second lens 102 in Embodiment 1 include a convex meniscus lens and a convex meniscus lens.

The first lens 101 and the second lens 102 preferably respectively include semi-light-transmitting films 101a and 102a on the sides thereof facing the liquid crystal panel 200. The semi-light-transmitting film is alternatively referred to as a half mirror and serves to transmit part of the incident light from the side facing the liquid crystal panel 200 and to reflect other part thereof toward the liquid crystal panel 200.

The semi-light-transmitting film may be provided on the surface of the lens. Alternatively, there may be provided, separately from the lenses, a transparent base member having a surface on which a semi-light-transmitting film is formed. The semi-light-transmitting film is, for example, a metal thin film and prepared by, for example, vapor-depositing and sputtering silver, aluminum, or an alloy of these metals.

FIG. 1 shows the lens unit 100 including two lenses as an example. Alternatively, the lens unit 100 may include only the first lens 101. When the lens unit 100 includes only the first lens 101, the first lens 101 may be, for example, a Fresnel lens.

Liquid Crystal Panel

The liquid crystal panel 200 is a display panel for displaying a desired video and is a transmissive liquid crystal panel that transmits the light emitted by the backlight unit 300 toward the user.

The liquid crystal panel 200 is, for example, a liquid crystal panel including: a pair of substrates; and a liquid crystal layer sandwiched between the pair of substrates. For example, a liquid crystal layer 203 may be sandwiched between a TFT substrate 201 and a color filter substrate 202 and sealed with a sealing material 204. Either one or both of this pair of substrates include(s): an electrode for applying voltage across the liquid crystal layer; and a display driver integrated circuit (DDIC: display driver IC) 205 on the TFT substrate 201. The display driver integrated circuit 205 is electrically connected to a liquid-crystal-panel-drive flexible printed board (FPC) 206. An electric signal for driving the liquid crystal panel 200 is fed from the flexible printed board 206 to the display driver integrated circuit 205 to enable the display driver integrated circuit 205 to control the voltage applied to the electrode. When voltage is applied across the liquid crystal layer, the orientation of the liquid crystal molecules in the liquid crystal layer changes, thereby controlling the light incident to the liquid crystal panel 200.

The liquid crystal panel 200 may include polarizers, one on the lens unit 100 side thereof and another on the backlight unit 300 side thereof.

Backlight Unit

The backlight unit 300 is a device for emitting light toward the liquid crystal panel 200. Referring to FIG. 1, the backlight unit 300 includes a light-guide plate 310 and a light source 301 disposed facing a side face of the light-guide plate 310. The backlight unit 300 may additionally include: a reflective sheet 302 disposed on the rear face side of the light-guide plate 310; and an optical sheet 303 disposed on the front side of the light-guide plate 310 (on the liquid crystal panel 200 side). The light source 301 may be mounted, for example, to a light-source-mounting flexible printed wiring board (FPC) 304. These members are housed inside a housing 305.

The light source 301 is, for example, a light-emitting diode (LED). A plurality of light sources 301 may be disposed on a side face of the light-guide plate 310. The light source 301 needs only to be disposed facing at least one side face of the light-guide plate 310. Letting a first direction $D^1$ be a direction perpendicular to a first side face 311a of the light-guide plate 310 and also letting a second side face 311b be a face opposite the first side face 311a in the first direction $D^1$, the backlight unit 300 may include a first light source 301a disposed facing the first side face 311a of the light-guide plate 310 and a second light source 301b disposed facing the second side face 311b of the light-guide plate 310. The first light source 301a and the second light source 301b are preferably disposed parallel to each other.

Figure 2A:
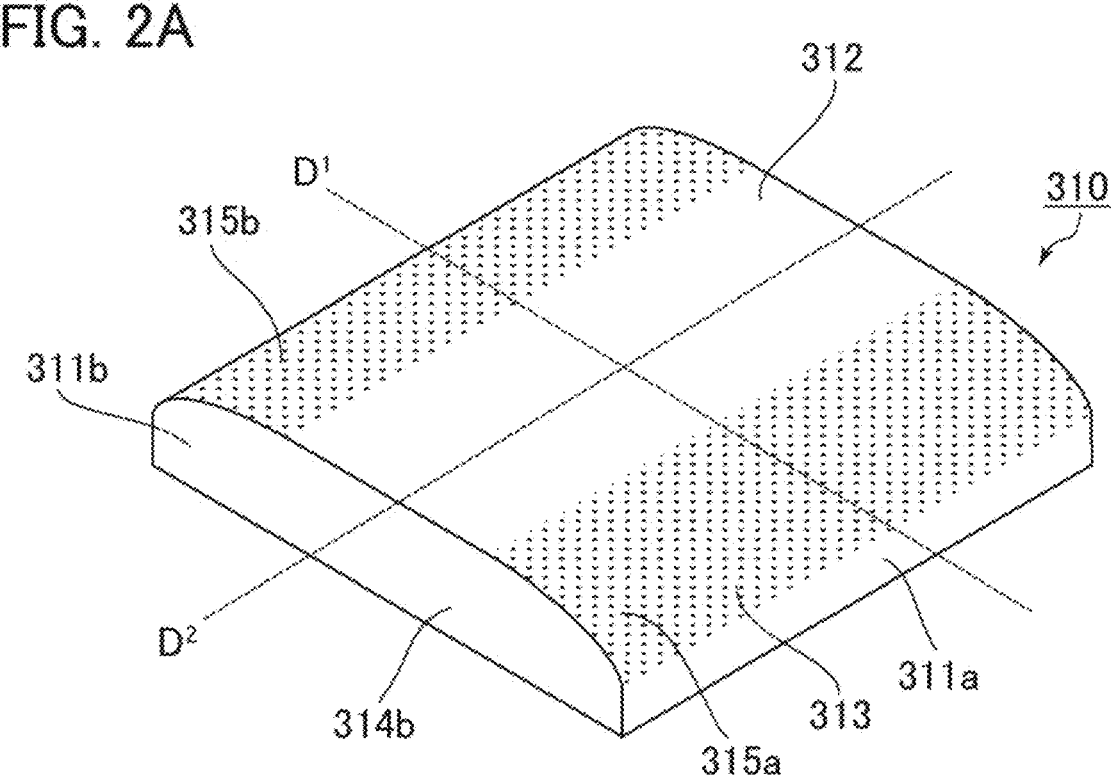
FIG. 2A is a perspective view of an example of a light-guide plate used in Embodiment 1.
Figure 2B:
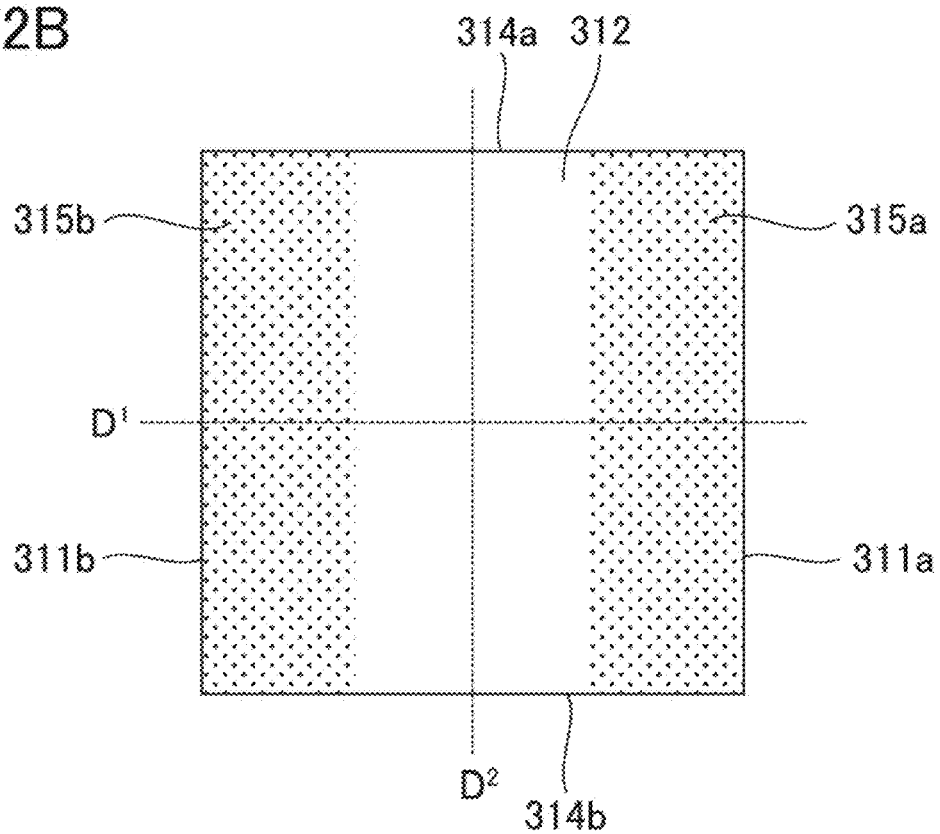
FIG. 2B is a schematic plan view of the light-guide plate shown in FIG. 2A as viewed from a light-exiting face side.
Figure 2C:
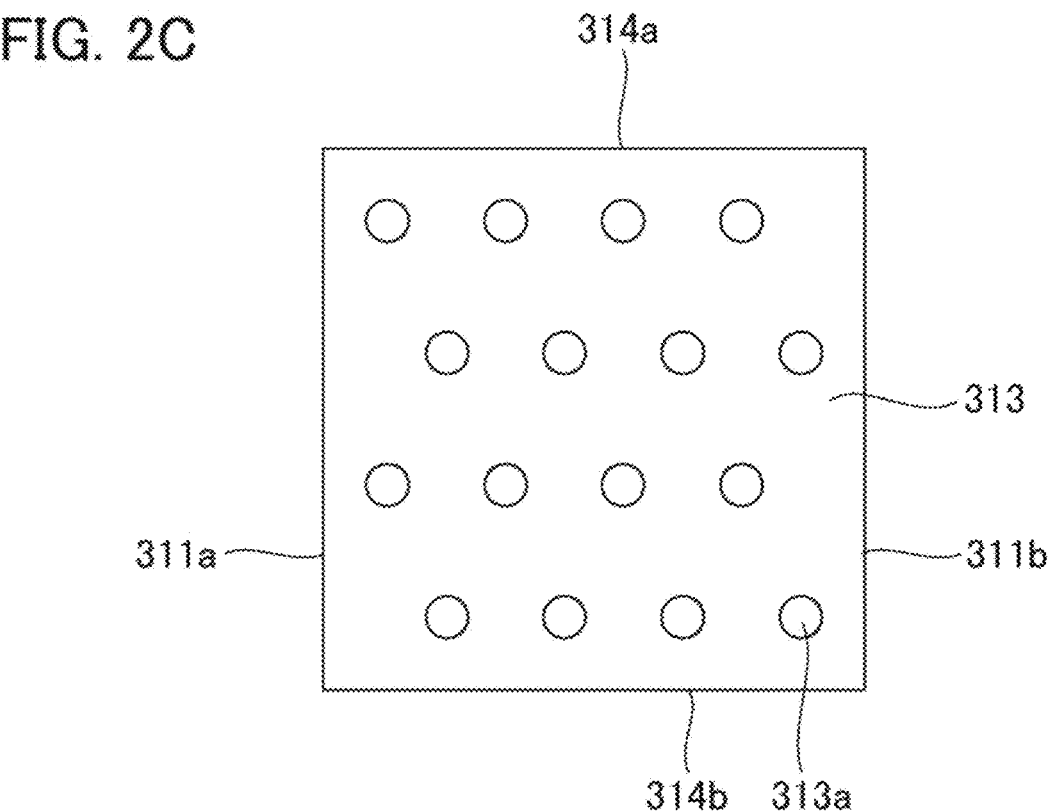
FIG. 2C is a schematic plan view of the light-guide plate shown in FIG. 2A as viewed from a rear face side.

The light-guide plate 310 is a member for discharging, toward the liquid crystal panel 200, the incident light from the light source 301 disposed facing a side face 311. The light-guide plate 310 may be made of a substance that is typically used in the field of backlights. FIG. 2A is a perspective view of an example of a light-guide plate used in Embodiment 1. FIG. 2B is a schematic plan view of the light-guide plate shown in FIG. 2A as viewed from a light-exiting face side. FIG. 2C is a schematic plan view of the light-guide plate shown in FIG. 2A as viewed from a rear face side. Curved face portions are shown hatched in the perspective views of the light-guide plate and in the schematic plan views of the light-guide plate as viewed from the light-exiting face side throughout the present specification.

Referring to FIG. 2A, the light-guide plate 310 has the first side face 311a and the light-exiting face 312 through which the incident light from the first side face 311a is discharged toward the liquid crystal panel 200. The face that is opposite the light-exiting face 312 of the light-guide plate 310 is a rear face 313. Referring to FIGS. 2A and 2B, letting the first direction $D^1$ be a direction perpendicular to the first side face 311a, the light-guide plate 310 has the second side face 311b opposite the first side face 311a in the first direction $D^1$. In addition, the light-guide plate 310 may further have a third side face 314a and a fourth side face 314b that are opposite each other in a second direction $D^2$ that is perpendicular to the first direction $D^1$. When the first light source is disposed facing the first side face 311a and the second light source is disposed facing the second side face 311b, the first side face 311a and the second side face 311b may be referred to as light-entering faces. These light-entering faces are preferably perpendicular to the rear face 313. The rear face 313 may have no curved face portion and hence be flat.

Figure 2D:
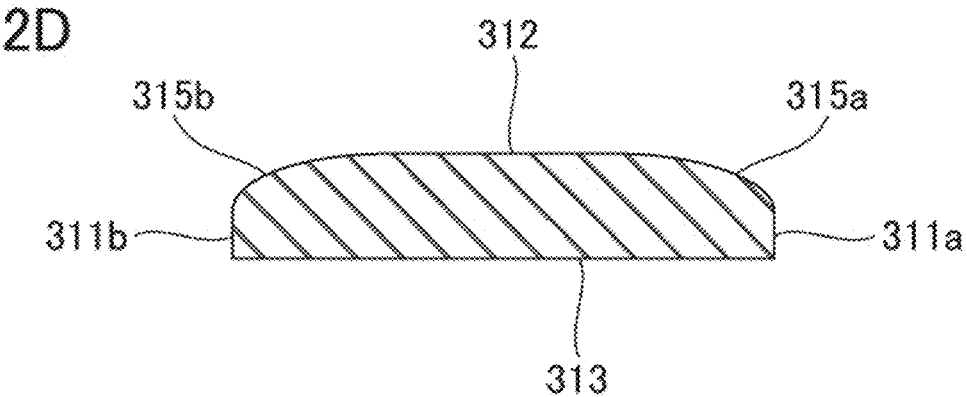
FIG. 2D is a schematic cross-sectional view of the light-guide plate shown in FIG. 2A as viewed in a first direction $D^1$.

FIG. 2D is a schematic cross-sectional view of the light-guide plate shown in FIG. 2A as viewed in the first direction $D^1$. The light-guide plate 310 has a curved face portion in the cross-section thereof in the first direction $D^1$. This cross-section in the first direction $D^1$ is a cross-section that is perpendicular to the first side face 311a and the light-exiting face 312. Referring to FIG. 2D, in Embodiment 1, the curved face portion includes a first curved face portion 315a disposed between the first side face 311a and the light-exiting face 312 and a second curved face portion 315b disposed between the second side face 311b and the light-exiting face 312 in the cross-section in the first direction $D^1$. The provision of the curved face portions between the light-entering face and the light-exiting face of the light-guide plate 310 enables preventing excessively converging light along the outer periphery of the light-guide plate 310 and increasing the quantity of the light discharged in oblique directions. By increasing the quantity of the light discharged in oblique directions, uniformity can be increased of the luminance across the field of view of the user (detailed later). Embodiment 1 discusses an example where the first curved face portion 315a and the second curved face portion 315b have the same radius of curvature.

Figure 2E:
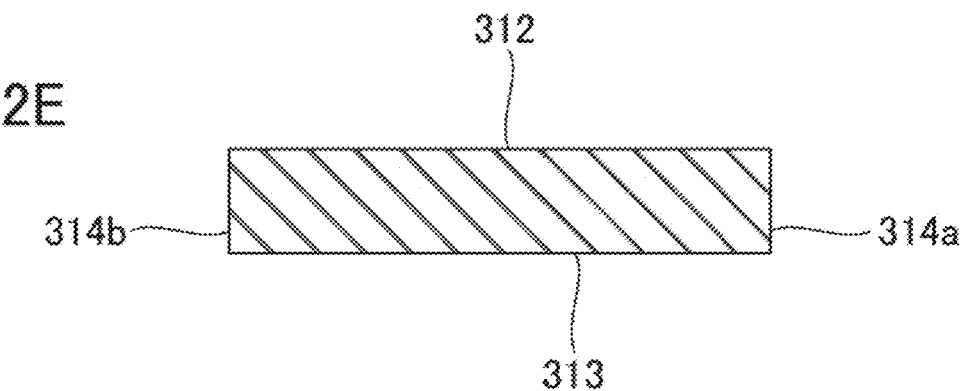
FIG. 2E is a schematic cross-sectional view of the light-guide plate shown in FIG. 2A as viewed in a second direction $D^2$.

The curved face portion needs only to be disposed between the light-exiting face 312 and the side face on which there is provided a light source (the light-entering face) and may not necessarily be disposed in the cross-section of the light-guide plate in the second direction $D^2$. FIG. 2E is a schematic cross-sectional view of the light-guide plate shown in FIG. 2A as viewed in the second direction $D^2$. When the curved face portion is not disposed in the cross-section of the light-guide plate in the second direction $D^2$, the cross-sectional shape in the second direction $D^2$ may be rectangular as shown in FIG. 2E.

Figure 5:
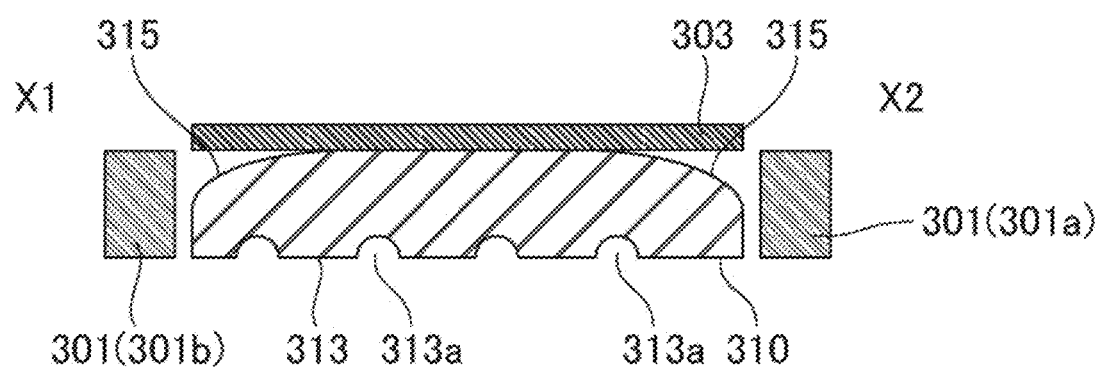
FIG. 5 is a schematic cross-sectional view taken along line X1-X2 in FIGS. 3 and 4.
Figure 6:
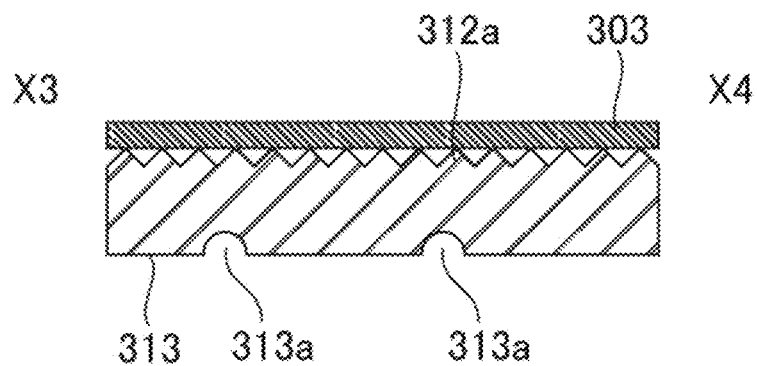
FIG. 6 is a schematic cross-sectional view taken along line X3-X4 in FIGS. 3 and 4.
Figure 7A:
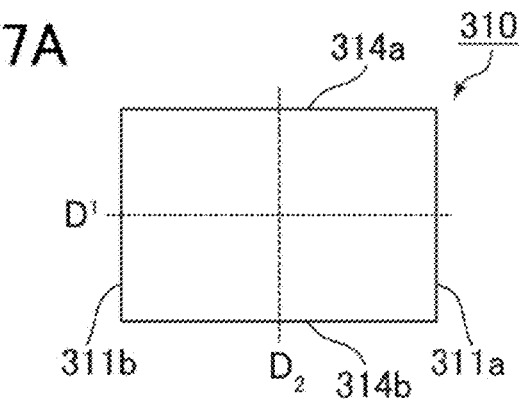
FIGS. 7A to 7G are schematic plan views of an exemplary plan-view shape of a light-guide plate.
Figure 7B:
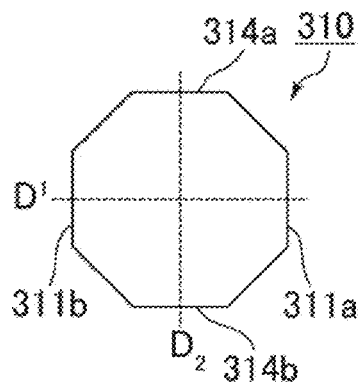
Figure 7C:
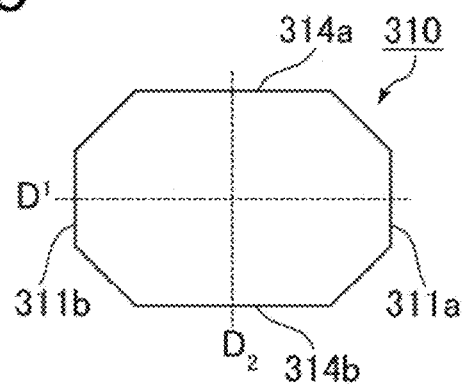
Figure 7D:
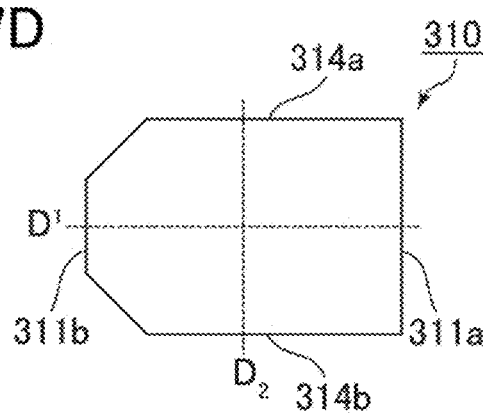
Figure 7E:
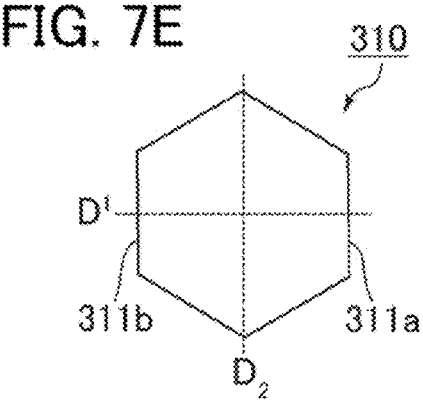
Figure 7F:
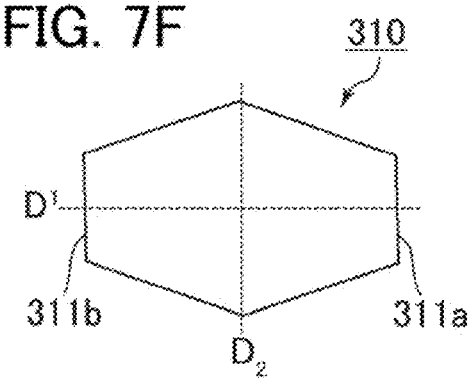
Figure 7G:
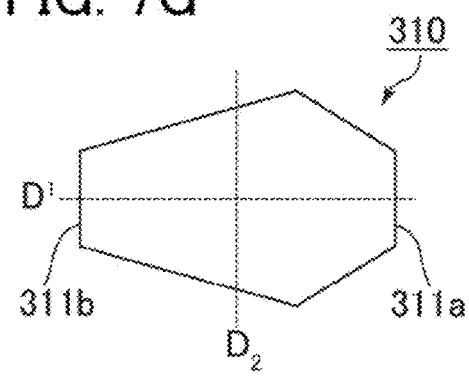

FIG. 3 is a schematic plan view of light sources and a light-guide plate with a plurality of recesses and a plurality of linear portions as viewed from the light-exiting face side. FIG. 4 is a schematic plan view of light sources and a light-guide plate with a plurality of recesses and a plurality of linear portions as viewed from the rear face side. FIG. 5 is a schematic cross-sectional view taken along line X1-X2 in FIGS. 3 and 4. FIG. 6 is a schematic cross-sectional view taken along line X3-X4 in FIGS. 3 and 4. The light-guide plate 310 preferably has a plurality of linear portions 312a running in the first direction in the light-exiting face 312 as shown in FIG. 3. Note that FIGS. 2A and 2C do not show the plurality of linear portions to show the location of the curved face portion. Additionally, the light-guide plate 310 preferably has a plurality of recesses 313a formed toward the light-exiting face 312 in the rear face 313 opposite the light-exiting face 312 as shown in FIG. 2C. The provision of the plurality of linear portions 312a and the plurality of recesses 313a enables the light-guide plate 310 to efficiently discharge the light incident on the light-entering face toward the liquid crystal panel 200 through the light-exiting face.

Referring to FIGS. 3 and 6, the plurality of linear portions 312a may be a plurality of triangular prisms extending in the first direction $D^1$ and arranged in the second direction $D^2$. Alternatively, the plurality of linear portions may be a plurality of hemicylindrical lenticular lenses extending in the first direction $D^1$ and arranged in the second direction $D^2$.

Referring to FIGS. 4 to 6, the plurality of recesses 313a may be a dot pattern with each recess having a semi-spherical shape. Alternatively, each recess may be shaped like a pyramid or cone such as a polygonal pyramid or a circular cone.

FIGS. 7A to 7G are schematic plan views of an exemplary plan-view shape of a light-guide plate. The plan-view shape of the light-guide plate 310 as viewed from the light-exiting face side or the rear face side thereof is, for example, a quadrilateral such as a square (see FIGS. 2B and 2C) or a rectangle (see FIG. 7A). There may be provided an inclined face or a curved face between either the first side face 311a or the second side face 311b and either the third side face 314a or the fourth side face 314b. In addition, the length of the first side face 311a measured in the second direction $D^2$ may be either equal to or differ from the length of the second side face 311b measured in the second direction $D^2$. Specific examples include octagons formed by replacing the four corners of a square or a rectangle with inclined faces (see FIGS. 7B and 7C) and hexagons formed by replacing the two corners of a square or a rectangle with inclined faces (see FIG. 7D). The light-guide plate 310 needs only to have at least a light-entering face (first side face 311a) opposite the first light source. Examples of the light-guide plate 310 include regular hexagons (see FIG. 7E), hexagons with a diameter longer in the first direction than in the second direction (see FIG. 7F), and hexagons with the first side face 311a having a longer length in the second direction $D^2$ than the second side face 311b having a length in the second direction $D^2$ (see FIG. 7G).

The reflective sheet 302 is provided for improved light use efficiency and is not limited in any particular manner so long as the reflective sheet 302 can reflect the light incident from the front of the light-guide plate 310 (the liquid crystal panel 200 side).

The optical sheet 303 is not limited in any particular manner so long as the optical sheet 303 can control the properties of the light incident to the liquid crystal panel 200. Examples of the optical sheet 303 include diffusion sheets, lens sheets, luminance-enhancing sheets, and viewing-angle-restricting sheets.

Figure 8:
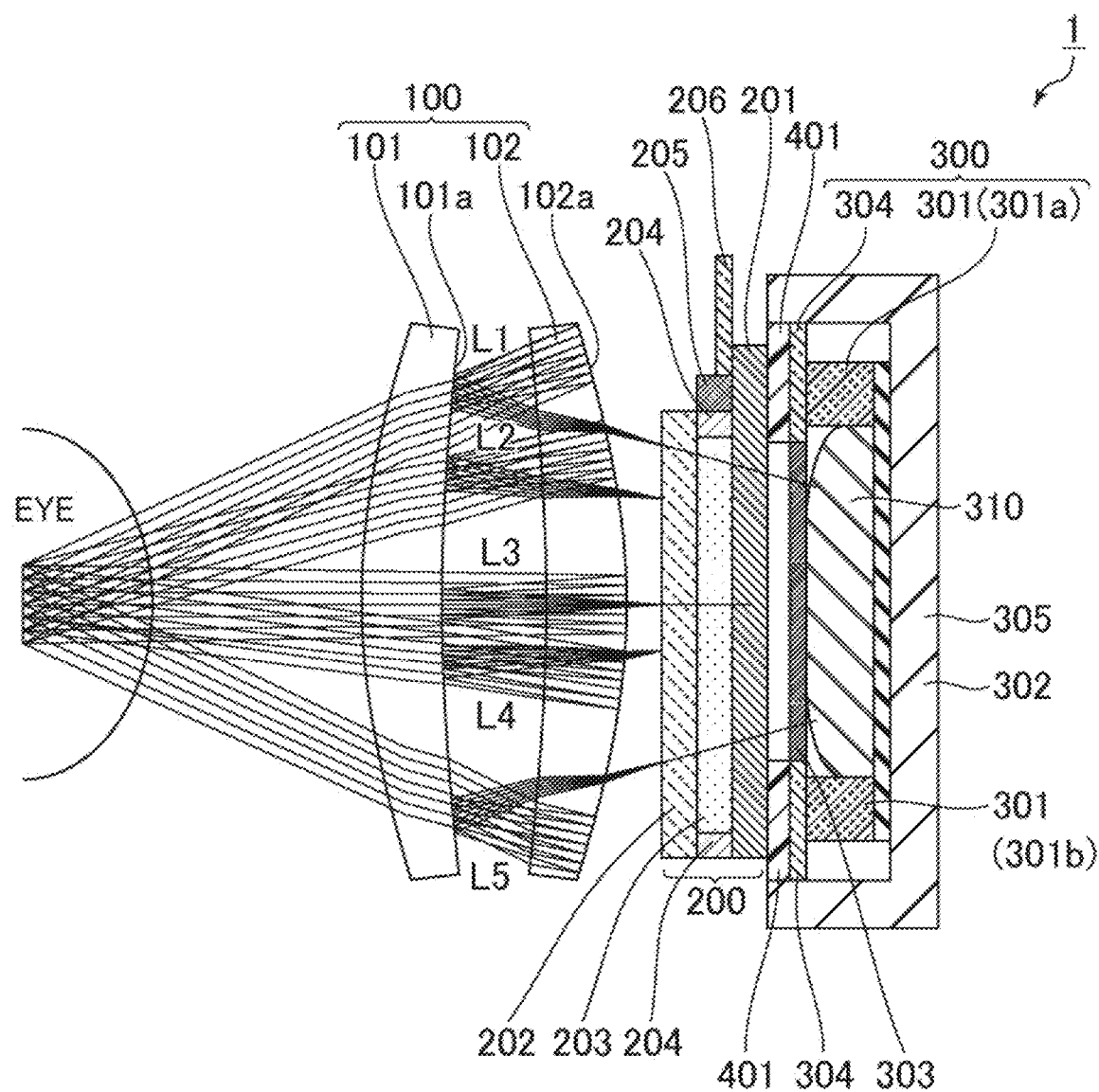
FIG. 8 is a schematic cross-sectional view illustrating a display method for the liquid crystal module shown in FIG. 1.

FIG. 8 is a schematic cross-sectional view illustrating a display method for the liquid crystal module shown in FIG. 1. The liquid crystal module in accordance with the present embodiment includes a folded optical system lens. Light L1 to L5 emitted by the backlight unit 300 is transmitted by the liquid crystal panel 200 and discharged toward the lens unit 100. The light incident to the second lens 102 is transmitted by the second lens 102 and reflected off the semi-light-transmitting film 101a on the first lens 101 toward the second lens 102. The light reflected toward the second lens 102 is transmitted by the second lens 102 and reflected off the semi-light-transmitting film 102a on the second lens 102 toward the first lens 101. The light reflected toward the first lens 101 is transmitted by the first lens 101 and then incident to the eye of the user, forming an image on the retina of the user. There is light, other than the light described here, that is reflected and transmitted by the semi-light-transmitting films 101a, 102a, description of which is omitted. The lens unit 100, disposed on the user side of the liquid crystal panel 200, adjusts the angle of the light incident to the eye of the user.

Depending on the properties of the ocular optical system described above, some of the light that is discharged in oblique directions can be discharged further outside L1 and L5 shown in FIG. 8 that travels significantly out of the viewing angle, which disadvantageously reduces the effective uniformity of luminance in the field of view visually recognized by the user. The conventional backlight unit is designed so that the light-guide plate can increase the uniformity of luminance in the front view and is configured so that the light from the light source can rise in the normal direction across the entire face. Therefore, even when the conventional backlight unit is used, luminance is high in the discharge directions of L2 to L4 in FIG. 8, and the effective uniformity of luminance visually recognized by the user remains low. In contrast, in the present disclosure, decreases in luminance near the outer periphery of the liquid crystal module due to the properties of the ocular optical system can be restrained by providing the light-guide plate 310 with a curved face portion, and the uniformity of luminance in the field of view of the user can be increased by increasing the discharge directions of L2 to L4 shown in FIG. 8 to the angles of L1 and L5. In Embodiment 1, the angle of the light discharged from the light-guide plate 310 toward the liquid crystal panel 200 can be adjusted, and the quantity of the light discharged in oblique directions can be increased, by providing a curved face portion between the light-entering face and the light-exiting face of the light-guide plate 310.

Head-Mounted Display

The liquid crystal module can be used suitably in head-mounted displays (HMDs). The head-mounted display is a display device wearable on the head of the user, is shaped like, for example, a goggle, and is placed before the eyes of the user when worn by the user. The head-mounted display is suitable to viewing content compatible with, for example, VR (virtual reality) technology and AR (augmented reality) technology.

The HMD preferably includes the aforementioned liquid crystal module for the right eye and the aforementioned liquid crystal module for the left eye. In other words, the HMD preferably includes two of the aforementioned liquid crystal modules, one for the right eye and another for the left eye. The HMD may further include a support unit for enabling the user to wear the HMD on the head.

Embodiment 2

Figure 9A:
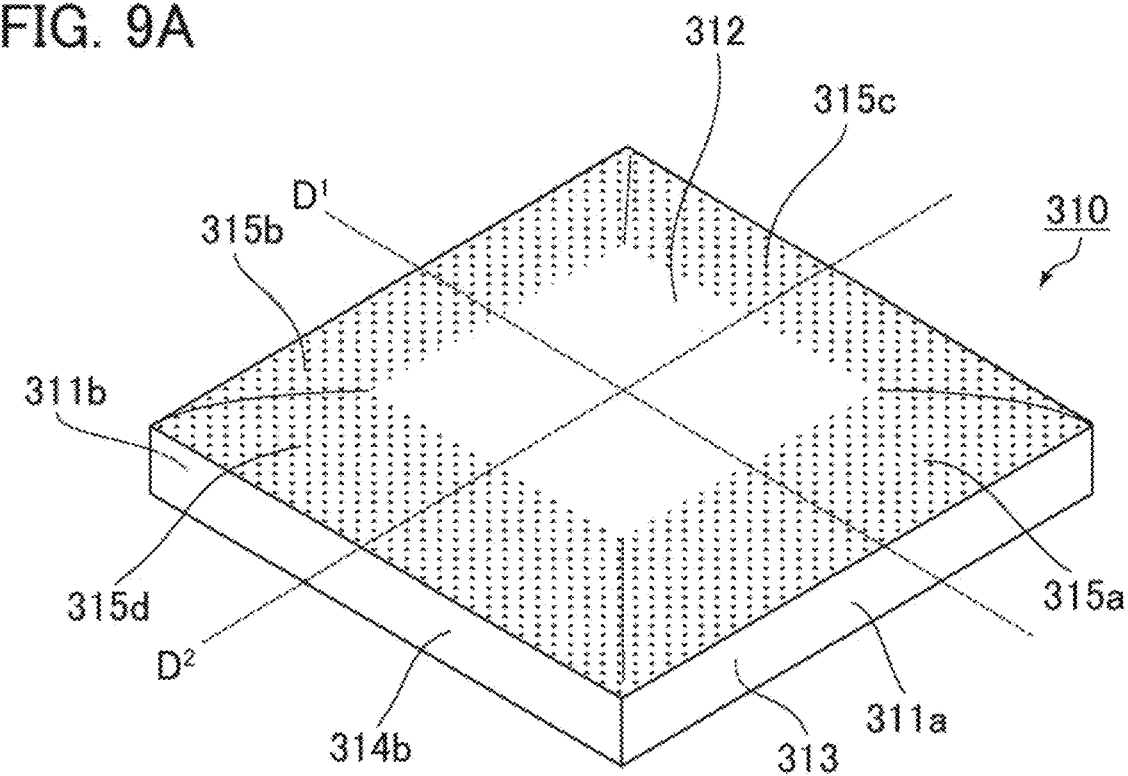
FIG. 9A is a perspective view of an example of a light-guide plate used in Embodiment 2.
Figure 9B:
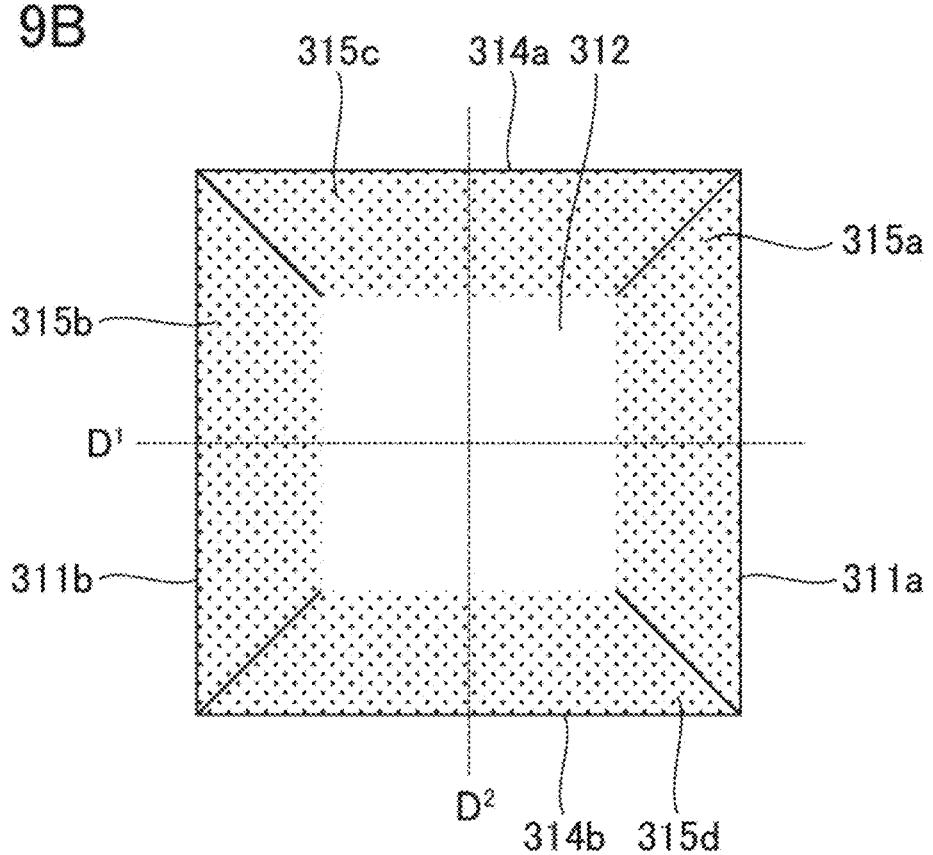
FIG. 9B is a schematic plan view of the light-guide plate shown in FIG. 9A as viewed from a light-exiting face side.
Figure 9C:
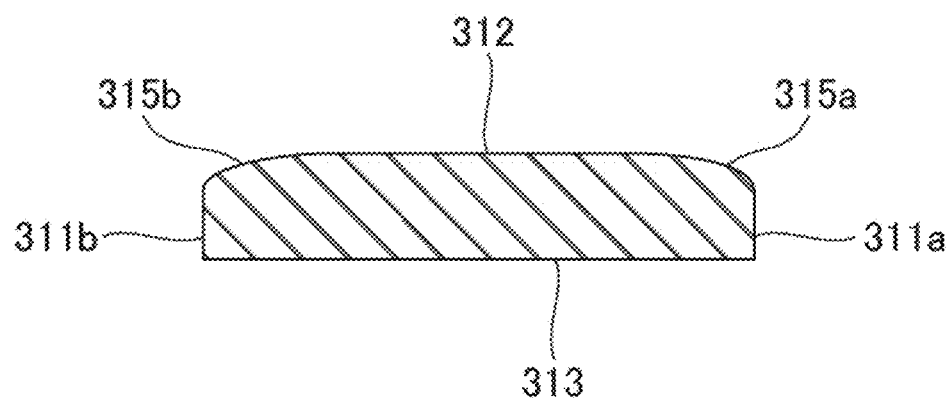
FIG. 9C is a schematic cross-sectional view of the light-guide plate shown in FIG. 9A as viewed in the first direction $D^1$.
Figure 9D:
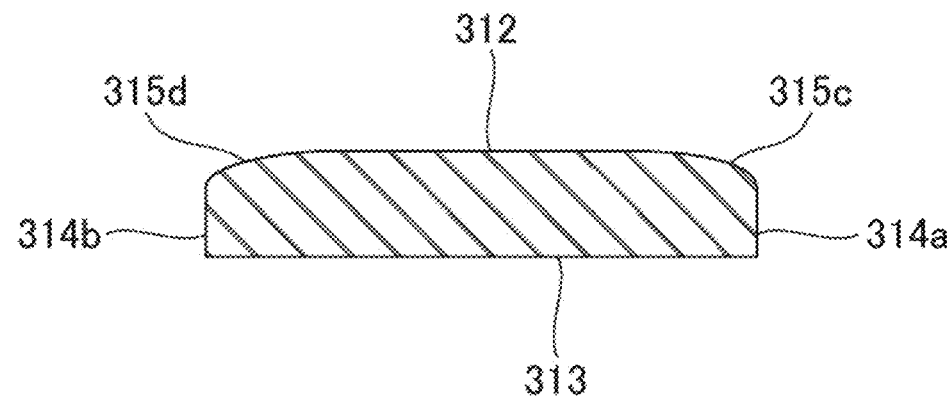
FIG. 9D is a schematic cross-sectional view of the light-guide plate shown in FIG. 9A as viewed in the second direction $D^2$.

FIG. 9A is a perspective view of an example of a light-guide plate used in Embodiment 2. FIG. 9B is a schematic plan view of the light-guide plate shown in FIG. 9A as viewed from the light-exiting face side. FIG. 9C is a schematic cross-sectional view of the light-guide plate shown in FIG. 9A as viewed in the first direction $D^1$. FIG. 9D is a schematic cross-sectional view of the light-guide plate shown in FIG. 9A as viewed in the second direction $D^2$. A schematic plan view of the light-guide plate shown in FIG. 9A as viewed from the rear face side is the same as FIG. 2C and hence omitted.

Referring to FIGS. 9A to 9C, similarly to Embodiment 1, the curved face portion includes, in the cross-section in the first direction $D^1$, a first curved face portion 315a between the first side face 311a and the light-exiting face 312 and a second curved face portion 315b between the second side face 311b and the light-exiting face 312. In Embodiment 2, referring to FIGS. 9A, 9B, and 9D, the curved face portion further includes, in the cross-section in the second direction $D^2$, a third curved face portion 315c between the third side face 314a and the light-exiting face 312 and a fourth curved face portion 315d between the fourth side face 314b and the light-exiting face 312. This cross-section in the second direction $D^2$ is parallel to the first side face 311a and perpendicular to the light-exiting face 312.

Letting the left/right direction and the up/down direction be the horizontal direction and a direction perpendicular to the left/right direction respectively when the user is wearing the head-mounted display, decreases in luminance can be prevented in the up/down direction, as well as in the left/right direction, by providing the first curved face portion 315a and the second curved face portion 315b in the left/right direction of the light-guide plate (in the first direction $D^1$) and further providing the third curved face portion 315c and the fourth curved face portion 315d in the up/down direction of the light-guide plate (in the second direction $D^2$). The first curved face portion 315a, the second curved face portion 315b, the third curved face portion 315c, and the fourth curved face portion 315d may have the same radius of curvature or different radii of curvature.

Exemplary preferred combinations of the first lens 101 and the second lens 102 in Embodiment 2 include an aspherical lens and a convex meniscus lens.

Embodiment 3

Figure 10:
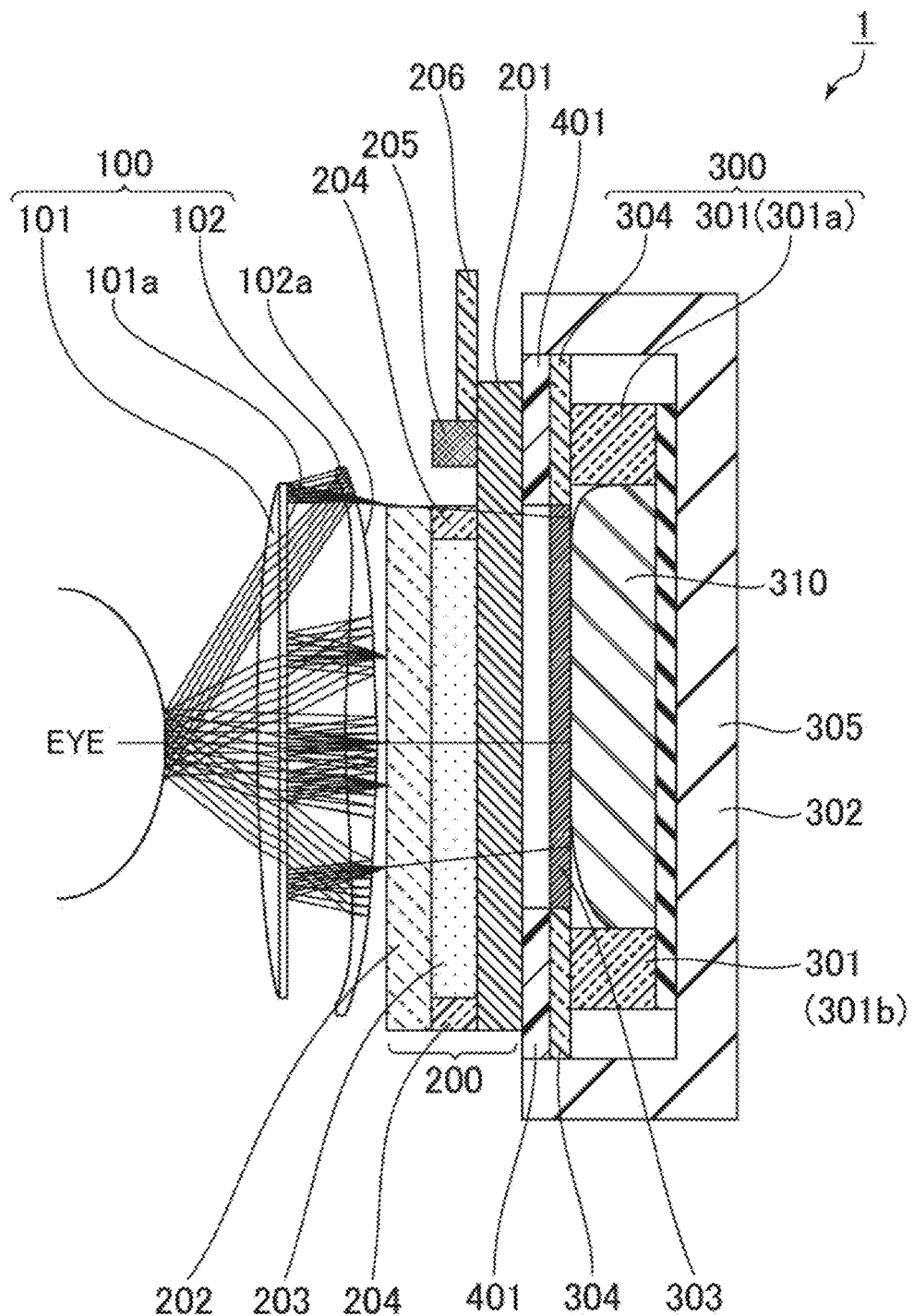
FIG. 10 is a schematic cross-sectional view of an example of a liquid crystal module in accordance with Embodiment 3.
Figure 11A:
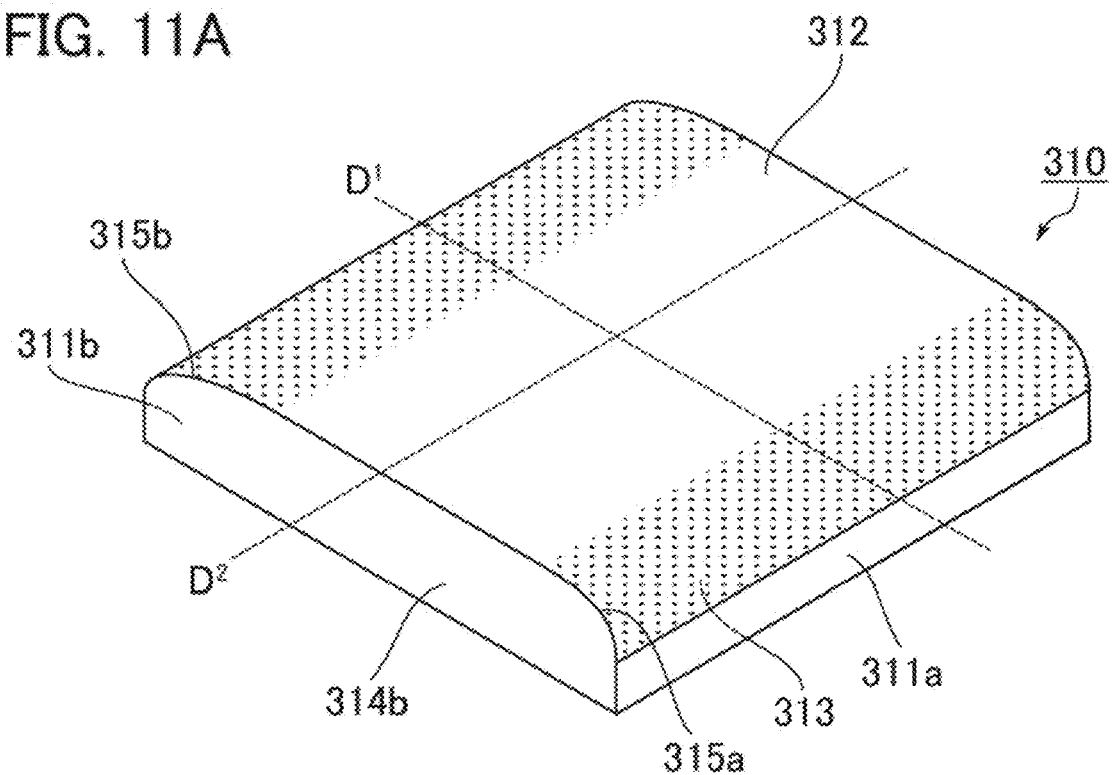
FIG. 11A is a perspective view of an example of a light-guide plate used in Embodiment 3.
Figure 11B:
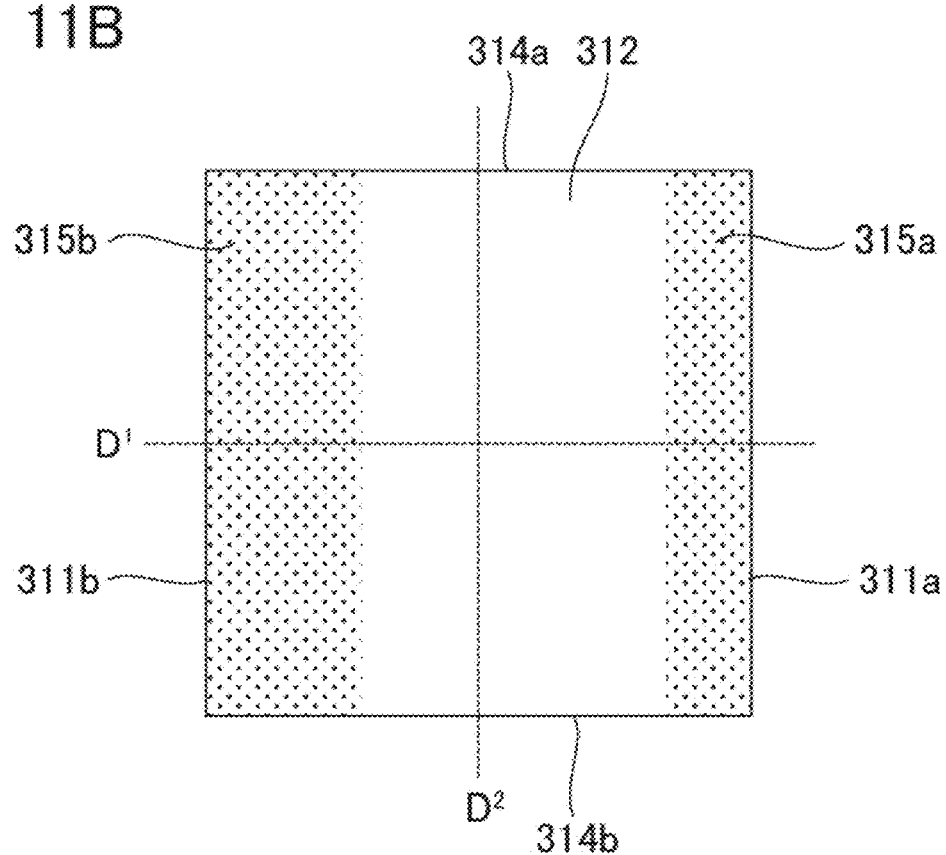
FIG. 11B is a schematic plan view of the light-guide plate shown in FIG. 11A as viewed from a light-exiting face side.
Figure 11C:
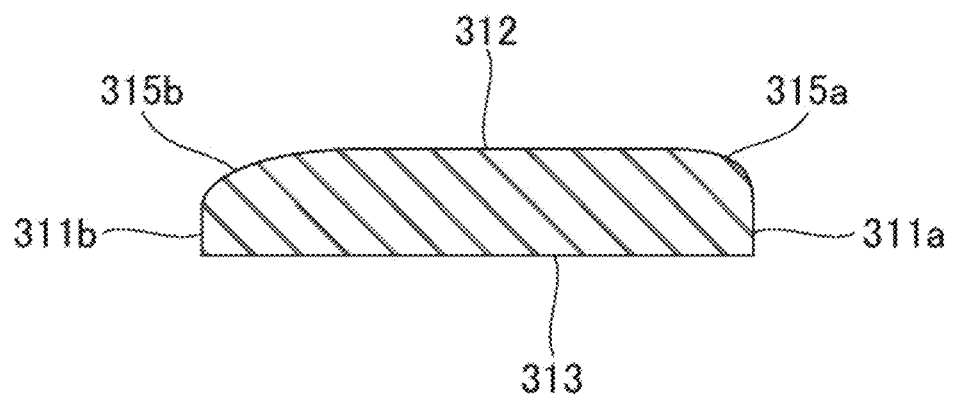
FIG. 11C is a schematic cross-sectional view of the light-guide plate shown in FIG. 11A as viewed in the first direction $D^1$.

The light-guide plate in Embodiment 3 has different radii of curvature in the first curved face portion and in the second curved face portion. FIG. 10 is a schematic cross-sectional view of an example of a liquid crystal module in accordance with Embodiment 3. FIG. 11A is a perspective view of an example of a light-guide plate used in Embodiment 3. FIG. 11B is a schematic plan view of the light-guide plate shown in FIG. 11A as viewed from the light-exiting face side. FIG. 11C is a schematic cross-sectional view of the light-guide plate shown in FIG. 11A as viewed in the first direction $D^1$. A schematic cross-sectional view of the light-guide plate shown in FIG. 11A as viewed in the second direction $D^2$, is the same as FIG. 2E and hence omitted. A schematic plan view of the light-guide plate shown in FIG. 11A as viewed from the rear face side is the same as FIG. 2C and hence omitted.

Referring to FIGS. 11A to 11C, similarly to Embodiment 1, the curved face portion includes, in the cross-section in the first direction $D^1$, a first curved face portion 315a between the first side face 311a and the light-exiting face 312 and a second curved face portion 315b between the second side face 311b and the light-exiting face 312. In Embodiment 3, the first curved face portion 315a and the second curved face portion 315b have different radii of curvature. The second curved face portion 315b may have a larger radius of curvature than the first curved face portion 315a.

Figure 12:
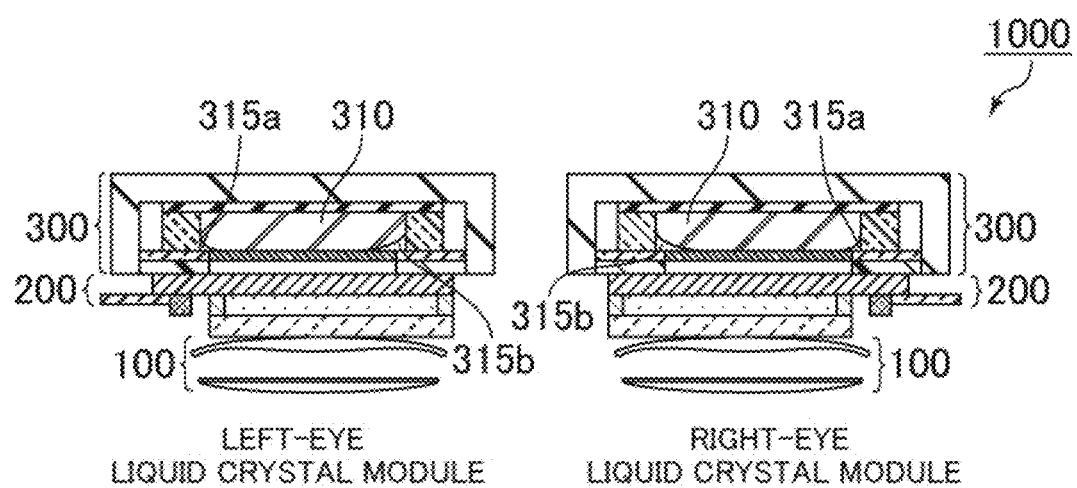
FIG. 12 is a schematic cross-sectional view of a head-mounted display using the liquid crystal module in accordance with Embodiment 3.

FIG. 12 is a schematic cross-sectional view of a head-mounted display using the liquid crystal module in accordance with Embodiment 3. FIG. 12 is a horizontal schematic cross-sectional view of the head-mounted display. A HMD 1000 in Embodiment 3 includes a right-eye liquid crystal module and a left-eye liquid crystal module. Each light-guide plate 310 in the liquid crystal modules for the right eye and the left eye, when in use, has a larger radius of curvature in a curved face portion (the second curved face portion 315b in FIG. 12) close to the center (nose) of the face of the user than in a curved face portion (the first curved face portion 315a in FIG. 12) close to the periphery (ear) of the face of the user. The effective luminance can be increased, and, for example, low electric power and high resolution are reasonably expected, by changing the shape of the light-guide plates in accordance with a lens apex angle in the right-eye liquid crystal module and the left-eye liquid crystal module in this manner.

Exemplary preferred combinations of the first lens 101 and the second lens 102 in Embodiment 3 include an aspherical lens and a convex meniscus lens.

Embodiments 1 to 3 may be combined where appropriate. Similarly to Embodiment 1, the light-guide plate 310 in Embodiments 2 and 3 preferably has a plurality of linear portions running in the first direction in the light-exiting face. In addition, the light-guide plate 310 preferably has a plurality of recesses formed toward the light-exiting face in the rear face opposite the light-exiting face. The plurality of linear portions and the plurality of recesses may be, for example, similar to those used in Embodiment 1.

Similarly to Example 2, the curved face portion of Embodiment 3 may include, in the cross-section in the second direction $D^2$, a third curved face portion 315c between the third side face 314a and the light-exiting face 312 and a fourth curved face portion 315d between the fourth side face 314b and the light-exiting face 312.

Embodiment 4

Figure 13:
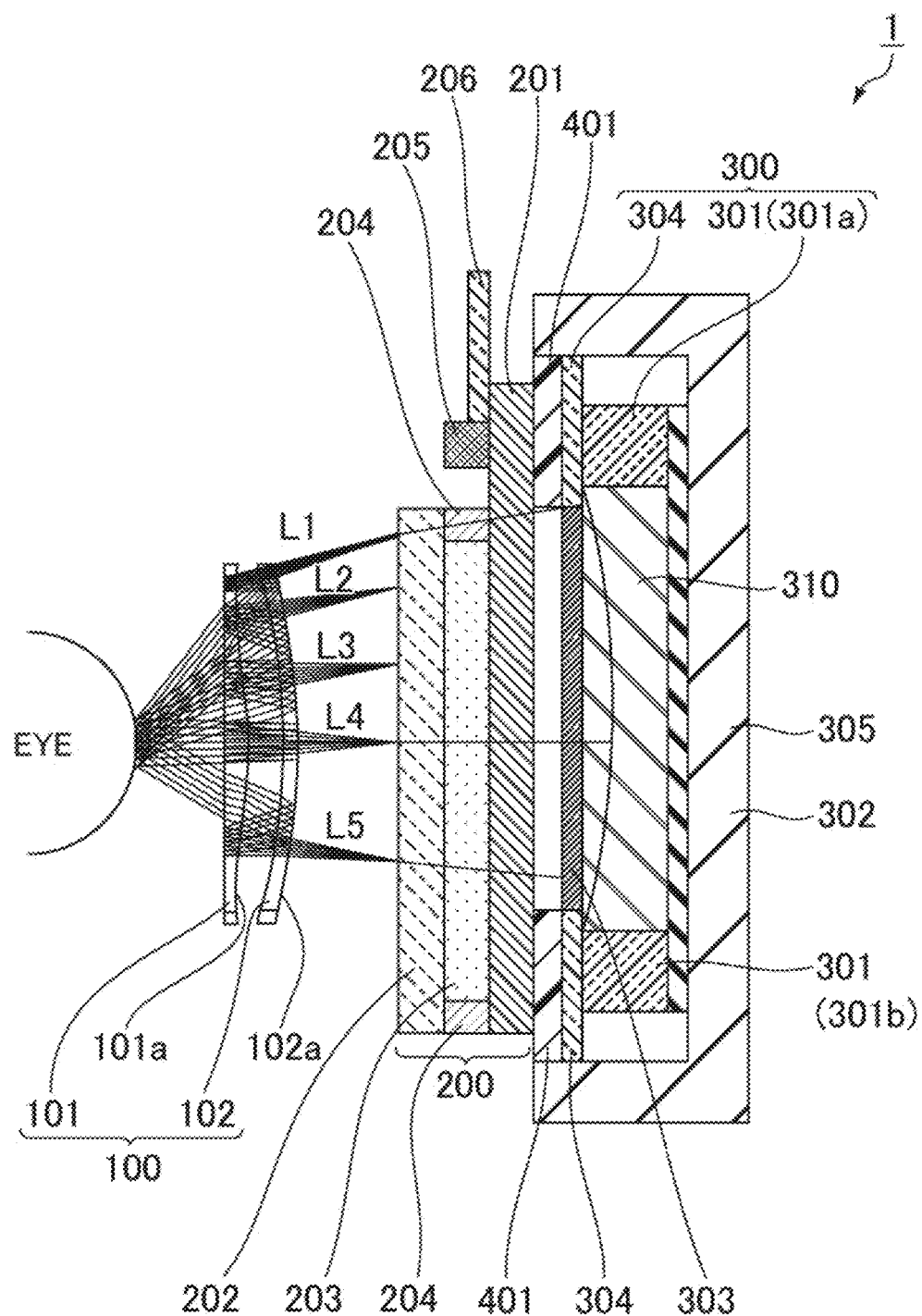
FIG. 13 is a schematic cross-sectional view of an example of a liquid crystal module in accordance with Embodiment 4.
Figure 14A:
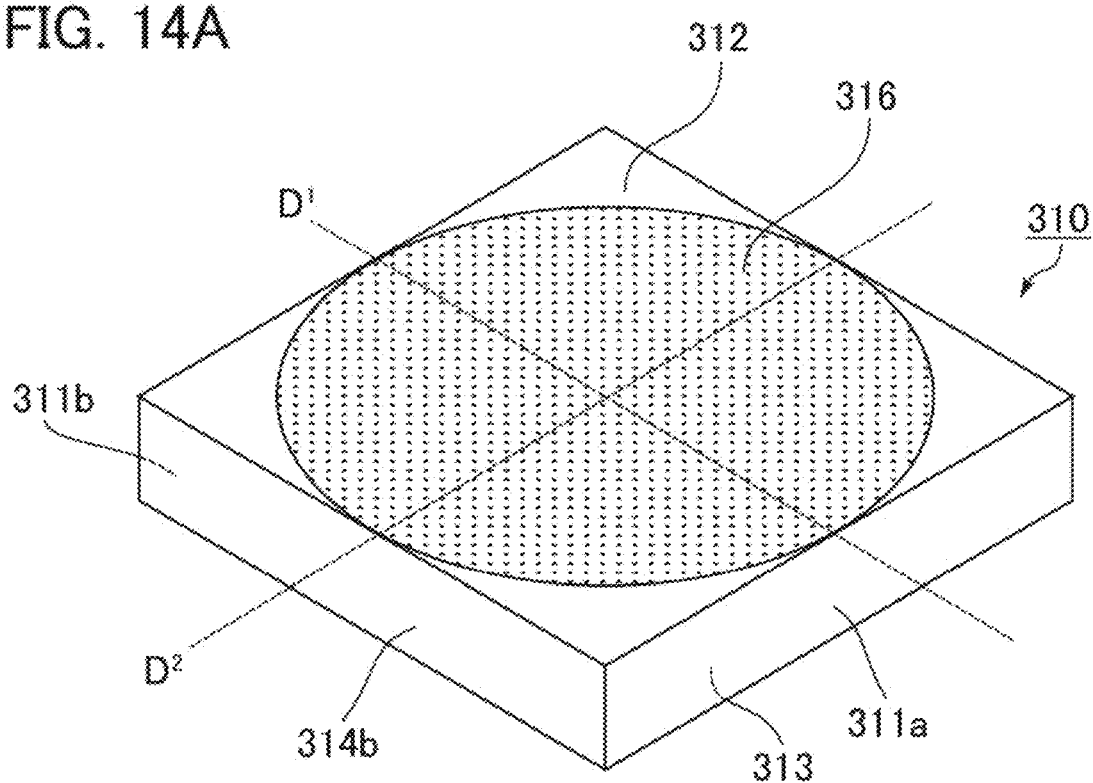
FIG. 14A is a perspective view of an example of a light-guide plate used in Embodiment 4.
Figure 14B:
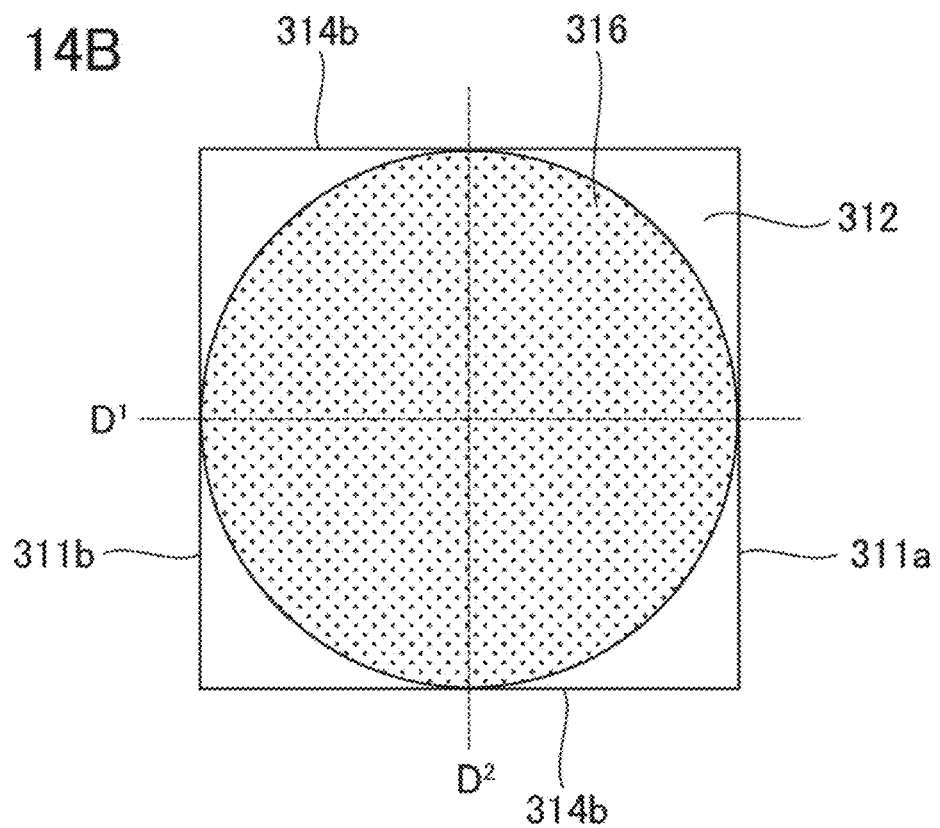
FIG. 14B is a schematic plan view of the light-guide plate shown in FIG. 14A as viewed from a light-exiting face side.
Figure 14C:
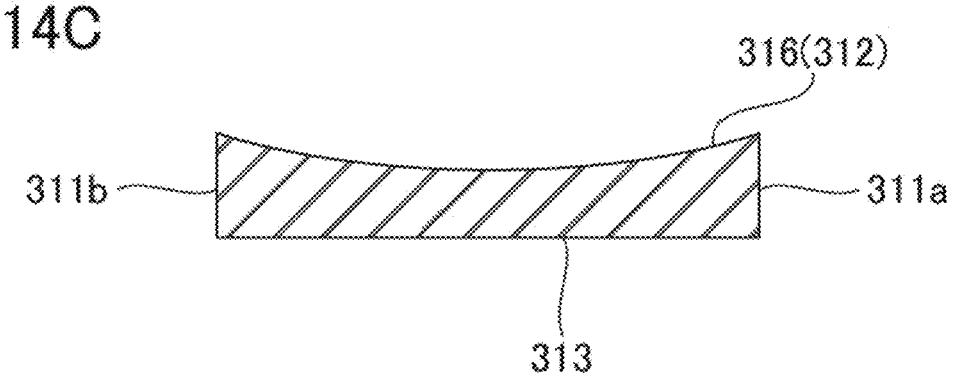
FIG. 14C is a schematic cross-sectional view of the light-guide plate shown in FIG. 14A as viewed in the first direction $D^1$.
Figure 14D:
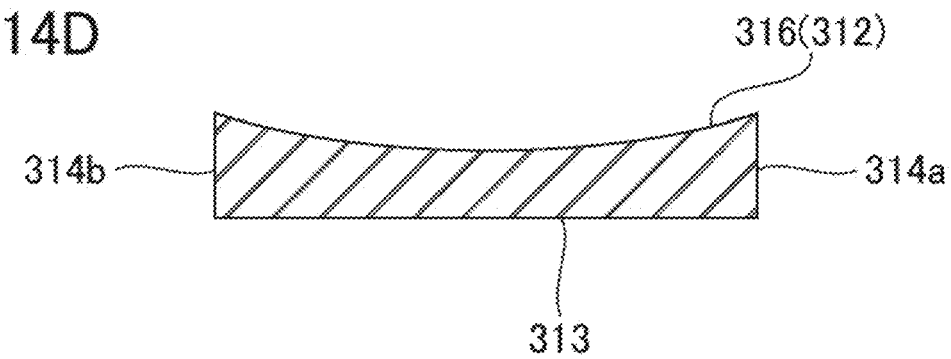
FIG. 14D is a schematic cross-sectional view of the light-guide plate shown in FIG. 14A as viewed in the second direction $D^2$.

FIG. 13 is a schematic cross-sectional view of an example of a liquid crystal module in accordance with Embodiment 4. FIG. 14A is a perspective view of an example of a light-guide plate used in Embodiment 4. FIG. 14B is a schematic plan view of the light-guide plate shown in FIG. 14A as viewed from the light-exiting face side. FIG. 14C is a schematic cross-sectional view of the light-guide plate shown in FIG. 14A as viewed in the first direction $D^1$. FIG. 14D is a schematic cross-sectional view of the light-guide plate shown in FIG. 14A as viewed in the second direction $D^2$. Referring to FIGS. 14A to 14D, the liquid crystal module in accordance with Embodiment 4 has a curved face portion 316 in the cross-section in the first direction $D^1$ which is perpendicular to the first side face 311a and the light-exiting face 312. The curved face portion 316 is disposed in a central portion of the light-exiting face 312 and curved toward the side opposite of the liquid crystal panel 200 as shown in FIG. 13. The rear face 313 may have no curved face portion and hence be flat.

The light-guide plate in accordance with Embodiment 4 has a concavely curved face. This shape enables adjusting the angle of the light discharged toward the liquid crystal panel 200 and increasing the quantity of the light discharged in oblique directions, thereby improving luminance in the periphery field of view.

Exemplary preferred combinations of the first lens 101 and the second lens 102 in Embodiment 4 include an aspherical lens and a convex meniscus lens.

Figure 15:
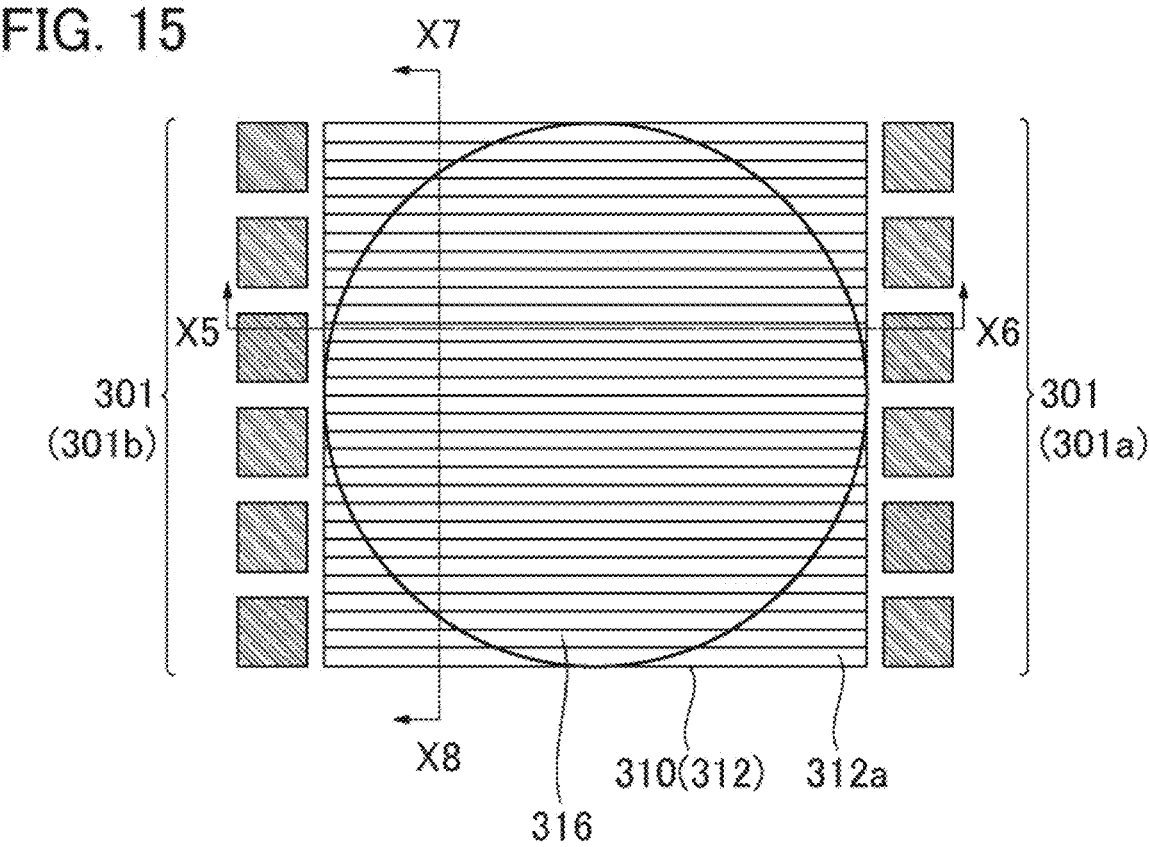
FIG. 15 is a schematic plan view of light sources and a light-guide plate with a plurality of recesses and a plurality of linear portions as viewed from a light-exiting face side.
Figure 16:
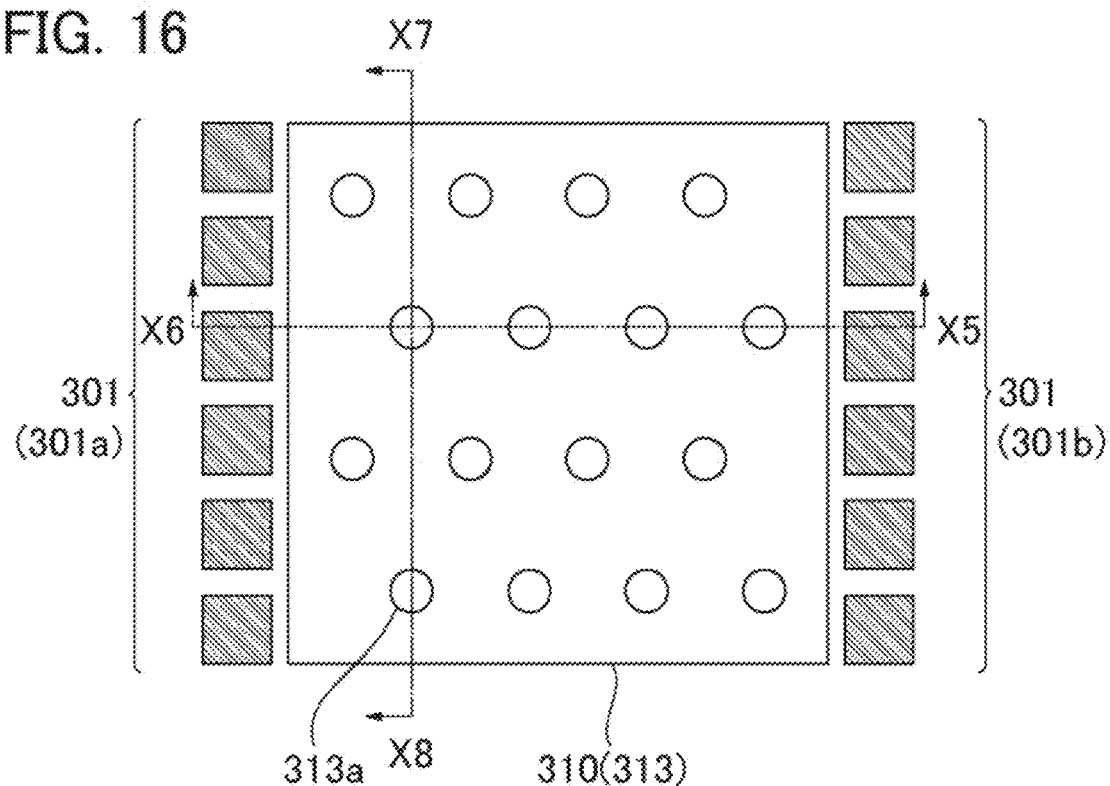
FIG. 16 is a schematic plan view of light sources and a light-guide plate with a plurality of recesses and a plurality of linear portions as viewed from a rear face side.
Figure 17:
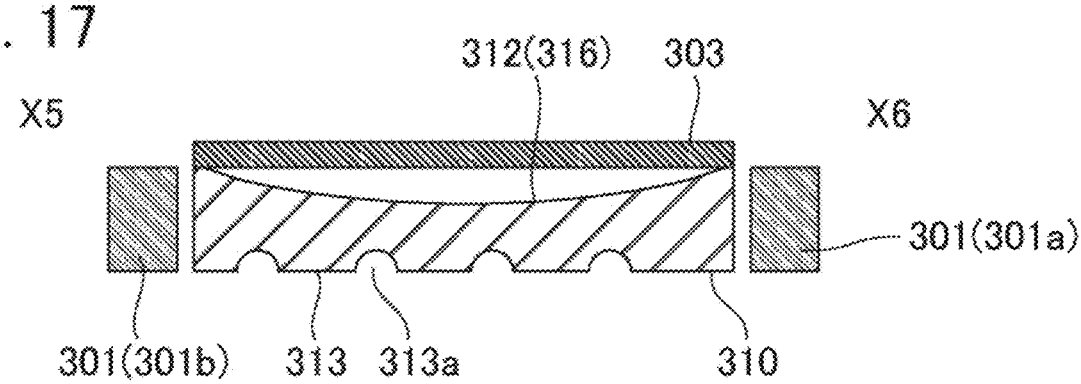
FIG. 17 is a schematic cross-sectional view taken along line X5-X6 in FIGS. 15 and 16.
Figure 18:
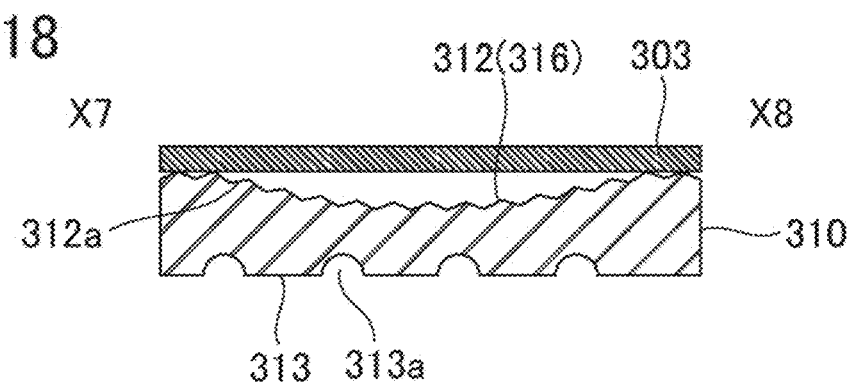
FIG. 18 is a schematic cross-sectional view taken along line X7-X8 in FIGS. 15 and 16.

FIG. 15 is a schematic plan view of light sources and a light-guide plate with a plurality of recesses and a plurality of linear portions as viewed from the light-exiting face side. FIG. 16 is a schematic plan view of light sources and a light-guide plate with a plurality of recesses and a plurality of linear portions as viewed from the rear face side. FIG. 17 is a schematic cross-sectional view taken along line X5-X6 in FIGS. 15 and 16. FIG. 18 is a schematic cross-sectional view taken along line X7-X8 in FIGS. 15 and 16. Similarly to Embodiment 1, the light-guide plate 310 in Embodiment 4 preferably has a plurality of linear portions running in the first direction in the light-exiting face. In addition, the light-guide plate 310 preferably has a plurality of recesses formed toward the light-exiting face in the rear face opposite the light-exiting face. The plurality of linear portions and the plurality of recesses may be, for example, similar to those used in Embodiment 1.

What is claimed is:

1. A liquid crystal module comprising:
   a lens unit including at least a first lens;
   a liquid crystal panel; and
   a backlight unit, all of which are provided in a stated order, wherein
   the backlight unit includes:
     a light-guide plate; and
     a first light source opposite a first side face of the light-guide plate, and
   the light-guide plate has:
     the first side face; and
     a light-exiting face through which light incident on the first side face is discharged toward the liquid crystal panel,
   the light-guide plate further having a curved face portion in a cross-section in a first direction that is perpendicular to the first side face and the light-exiting face.

2. The liquid crystal module according to claim 1, wherein the curved face portion includes a first curved face portion between the first side face and the light-exiting face in the cross-section in the first direction.

3. The liquid crystal module according to claim 2, wherein
   the light-guide plate has a second side face opposite the first side face in the first direction,
   the backlight unit includes a second light source opposite the second side face of the light-guide plate, and
   the curved face portion has a second curved face portion between the second side face and the light-exiting face in the cross-section in the first direction.

4. The liquid crystal module according to claim 3, wherein the first curved face portion and the second curved face portion have different radii of curvature.

5. The liquid crystal module according to claim 2, wherein
   the light-guide plate further has a third side face and a fourth side face opposite each other in a second direction that is perpendicular to the first direction, and
   the curved face portion includes, in a cross-section in the second direction, a third curved face portion between the third side face and the light-exiting face and a fourth curved face portion between the fourth side face and the light-exiting face.

6. The liquid crystal module according to claim 1, wherein the curved face portion is disposed in a central portion of the light-exiting face and curved toward a side opposite the liquid crystal panel.

7. The liquid crystal module according to claim 1, wherein the light-guide plate has a plurality of linear portions running in the first direction in the light-exiting face and a plurality of recesses formed toward the light-exiting face in a rear face opposite the light-exiting face.

8. The liquid crystal module according to claim 1, wherein
   the lens unit further includes a second lens between the first lens and the liquid crystal panel, and
   the first lens and the second lens include respective semi-light-transmitting films on the liquid crystal panel side.

9. A head-mounted display comprising:
   a liquid crystal module according to claim 1 for a right eye; and
   a liquid crystal module according to claim 1 for a left eye.

* * * * *